US011273956B2

(12) United States Patent
Thomas et al.

(10) Patent No.: US 11,273,956 B2
(45) Date of Patent: Mar. 15, 2022

(54) MODULAR CONTAINER HAVING MOLDABLE COMPONENT PARTS

(71) Applicants: Donald Thomas, Cooper City, FL (US); Anthony P. Habodasz, Troy, OH (US)

(72) Inventors: Donald Thomas, Cooper City, FL (US); Anthony P. Habodasz, Troy, OH (US)

(*) Notice: Subject to any disclaimer, the term of this patent is extended or adjusted under 35 U.S.C. 154(b) by 229 days.

(21) Appl. No.: 16/459,900

(22) Filed: Jul. 2, 2019

(65) Prior Publication Data
US 2020/0010240 A1 Jan. 9, 2020

Related U.S. Application Data

(60) Provisional application No. 62/693,532, filed on Jul. 3, 2018.

(51) Int. Cl.
*B65D 21/08* (2006.01)
*B65D 6/24* (2006.01)

(52) U.S. Cl.
CPC ........ *B65D 21/083* (2013.01); *B65D 11/1873* (2013.01)

(58) Field of Classification Search
CPC ... B65D 21/083; B65D 11/1873; B65D 15/24
USPC ................ 220/4.28, 293, 300, 691
See application file for complete search history.

(56) References Cited

U.S. PATENT DOCUMENTS

2013/0299490 A1* 11/2013 Hansen ................ B65D 88/522
220/7
2018/0353872 A1* 12/2018 Xia ........................ E04B 1/6104

* cited by examiner

*Primary Examiner* — Andrew D Perreault
(74) *Attorney, Agent, or Firm* — Mattingly & Malur, PC

(57) ABSTRACT

A modular container has identically molded sides pieces connected together at corner joints and separately molded, identical top/bottom pieces. The corner joints are formed by snap fit engagement of flexible locking tabs of one side piece with pockets on another side piece when the molded side pieces are serially connected together. The flexible locking tabs are biased oppositely to one another in alternating manner and each tab engages with a shoulder in the corresponding pocket to enable a zipper effect with respect to the assembly and disassembly of the corner joints. Two top/bottom pieces are secured by relative rotation to the assembled side pieces to form the container. An extension ring or divider can be used between upper and lower sets of the assembled side pieces to enable different container sizes. The component parts are molded with a degree of flexibility that enhances the assembly/disassembly of the corner joints.

7 Claims, 15 Drawing Sheets

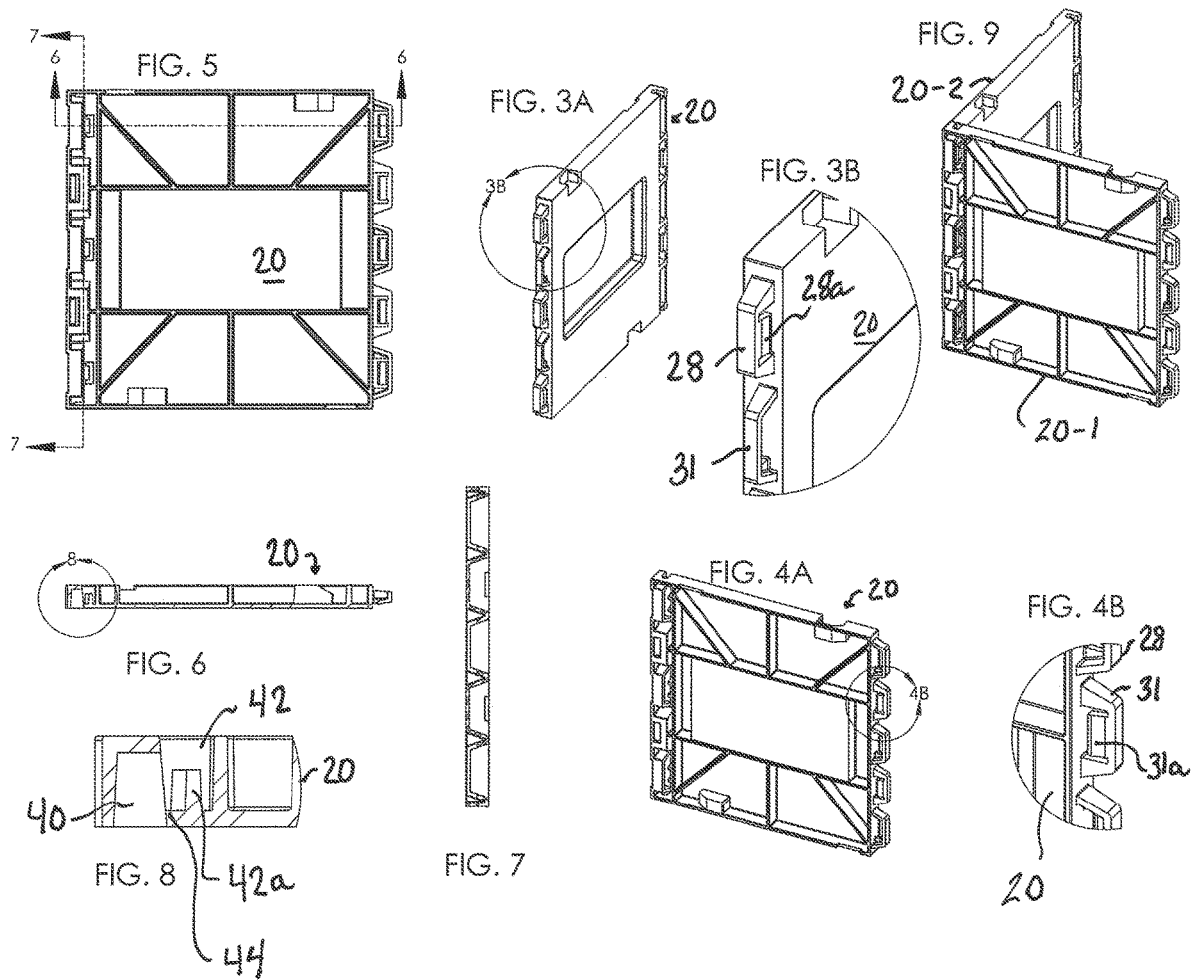

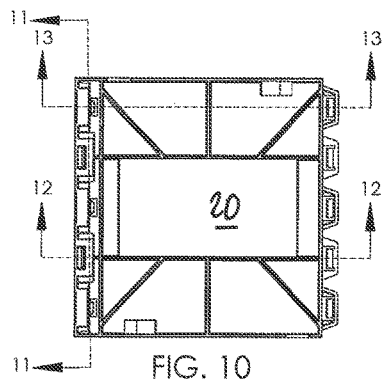
FIG. 10
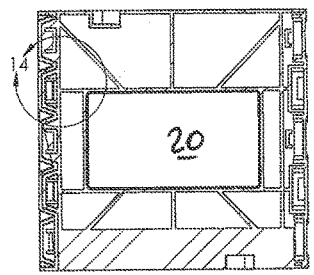
FIG. 11
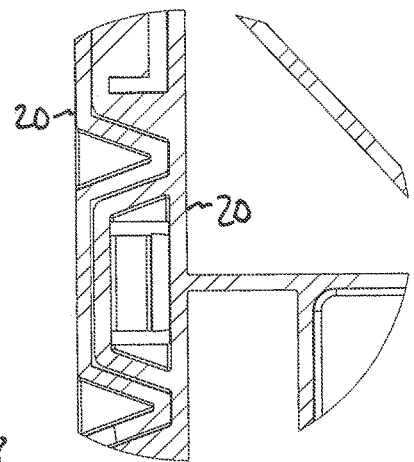
FIG. 14
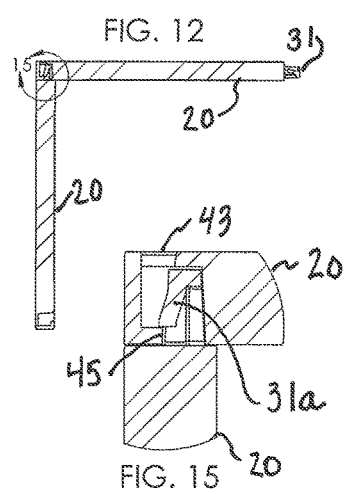
FIG. 12
FIG. 15
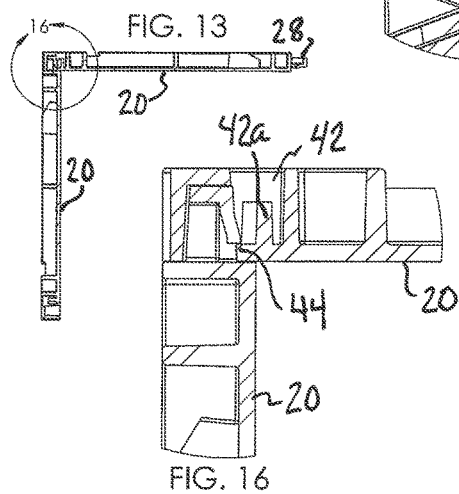
FIG. 13
FIG. 16

MODULAR CONTAINER HAVING MOLDABLE COMPONENT PARTS

FIELD OF THE INVENTION

The invention relates to a reusable modular container having synthetic resin molded parts or pieces that are able to be assembled together by hand without tools. The container is reusable and recyclable.

DESCRIPTION OF RELATED ART

Containers for storage and transport are well known and widely used. These include cardboard containers and containers formed of synthetic resin. In the transportation of articles via cardboard containers, the cardboard containers are primarily intended for single use and then recycled or otherwise subject to disposal. Containers molded from synthetic resin (plastic containers) have the benefit of durability and strength, assuring more cycles of use than cardboard containers. However, plastic containers are primarily molded in specific sizes for transportation of articles or storage of articles and the containers are molded of a specific type and size depending on the articles to be contained therein. Therefore, plastic containers are not generally thought to be sufficiently versatile and cost effective to replace cardboard containers in the transportation of articles of various sizes and quantities.

Plastic containers are able to be formed in many shapes and sizes, and are nestable and stackable for ease of shipping and return. However, plastic containers of the prior art do not compare to cardboard containers which are formed without the requirement of tools from a blank and easily broken down for recycling after use.

However, there are many disadvantages to cardboard containers. First, cardboard containers are not modular. A wide range of different sized blanks are required to be available in order to assemble cardboard containers of different sizes and shapes. Also, taping of the joints and the application of glue is required for strengthening cardboard, which presents a recycling problem. Plastic containers, on the other hand, are each typically made from just a single type of resin and are therefore more conveniently recycled, by grinding and reclamation, for example. On the other hand, known plastic container are not easily separated into component parts in a manner that permits the component parts to be returned to a recycling center in the same manner as cardboard.

SUMMARY OF THE INVENTION

A reusable and recyclable modular container having synthetic resin molded parts according to the invention is able to be assembled by hand without tools into various sizes.

The container is able to be assembled from one set of four side pieces that are each of the same configuration in combination with one set of top/bottom pieces that are each of the same configuration. One exemplary container is able to be assembled from only two different pieces in this respect since one part is molded for the side pieces and the other part is molded for the top/bottom pieces.

Containers of various sizes are available from combinations of different sized side pieces. Each sized set of four side pieces may be combined with correspondingly sized top/bottom pieces, with the understanding that the size of the top/bottom pieces depends on the polygonal shape, in top view, which results from the assembly of the set of side pieces.

Further, the container is also modular and, in this way, two or more sets of four side pieces may be joined together with a separate extension joining piece that joins each of the sets of four side pieces to increase the size and volume of the container. Therefore, the container of the invention is modular in that each section or module is comprised of a set of four side pieces and multiple sets of the four side pieces are able to be joined together to provide a wide range of sizes of containers.

Further, the separate joining piece that joins each of the sets of four side pieces to increase the size of the container may be a divider joining piece in some embodiments that physically separates one or more modules (sets of four side pieces) from another set to provide separated compartments within the same container. As a result, articles of different type, purpose or function may be shipped in the same container and separated in different modules of the container.

In view of the modular assembly of different sized plastic side pieces and correspondingly sized top/bottom pieces, containers are provided that are assembled by hand from a minimum number of separately molded component parts. Further, the overall shape of each of the component parts is able to be essentially thin walled and flat. Therefore, the side piece, top/bottom piece, and optional extension and divider joining pieces (component parts of the plastic container of the invention) are able to be stored until used in stacks of flat or thin walled pieces, essentially as blanks from which the plastic containers are to be assembled by hand.

The container is able to be opened by hand from either end or both ends to access the article(s) inside the container. The container is also able to be disassembled by use of a simple hand tool enabling the disassembly of the corner joints of the container (top/bottom pieces removed) to separate the component pieces from one another. The disassembly does not break apart the pieces, i.e. break off any small parts when the material and the dimensions of the pieces enable sufficiently flexibility. Accordingly, the disassembled pieces of the container are able to be subsequent reassembled from the same, previously assembled component pieces for additional use(s) of the container. This additionally provides for ease of replacement of damaged pieces in the event that small parts of the pieces do break off or otherwise become damaged. Accordingly, the container is able to be assembled and disassembled, for reuse and/or continued use of the container in many transportation and/or storage cycles.

Alternatively, the assembled or disassembled component pieces are able to be recycled. When the component pieces are disassembled, the disassembled component pieces are able to be stacked together in dense flat stack, suitable for collection and recycling.

BRIEF DESCRIPTION OF THE DRAWINGS

FIG. 3A is a perspective view of one side piece of the container of FIG. 1, with each of the set of four sides of the container of FIG. 1 being identical, and showing an interior wall of the side piece.

FIG. 3B is a detail view of an area 3B indicated in FIG. 3A.

FIG. 4A is a perspective view of the side piece of the container shown in FIG. 3 and showing an exterior wall of the side piece.

FIG. 4B is a detail view of an area 4B indicated in FIG. 4A.

FIG. 5 is a front plan view of the side piece of the container shown in FIG. 3 and showing an exterior wall of the side piece.

FIG. 6 is a cross sectional view of the side piece of the container taken along line 6-6 of FIG. 5.

FIG. 7 is a cross sectional view of the side piece of the container taken along line 7-7 of FIG. 5.

FIG. 8 is a detail view of an area 8 indicated in FIG. 6.

FIG. 9 is a perspective view of two side pieces of the four side pieces of the container shown in FIG. 1 and connected together at respective edges, and forming one corner of the container.

FIG. 10 is a plan view of two side pieces of the container shown in FIG. 1 and showing an exterior wall of one of the two sides.

FIG. 11 is a cross sectional view of the connected side pieces taken along line 11-11 of FIG. 10.

FIG. 12 is a cross sectional view of the connected side pieces taken along long line 12-12 of FIG. 10.

FIG. 13 is a cross sectional view of the connected side pieces taken along long line 13-13 of FIG. 10.

FIG. 14 is a detail view of an area 14 indicated in FIG. 11.

FIG. 15 is a detail view of an area 15 indicated in FIG. 12.

FIG. 16 is a detail view of an area 16 indicated in FIG. 13.

FIG. 49 is a partial view on an enlarged scale of the cross sectional view of FIG. 16 additionally showing a hand tool in position to disengage the locking tab at the position shown in

FIG. 47.

DETAILED DESCRIPTION

Figure 2:
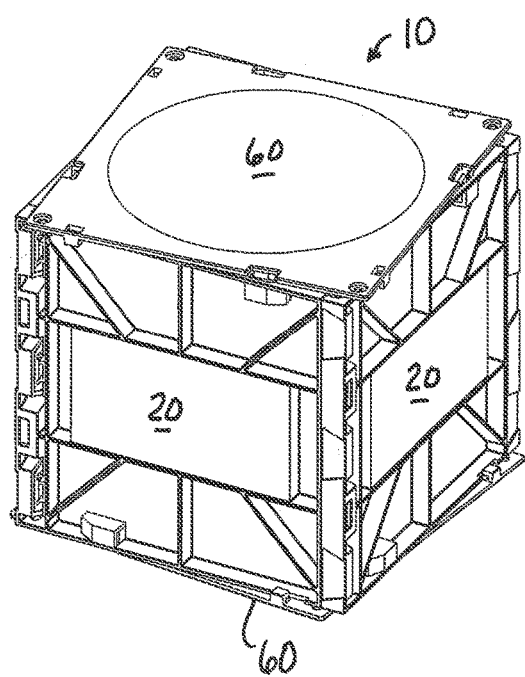
FIG. 2 shows the container of FIG. 1 in which each of the top/bottom pieces are in a position be engaged to the four sides of the container by further clockwise rotation of the top/bottom pieces with respect to the four sides.
Figure 1:
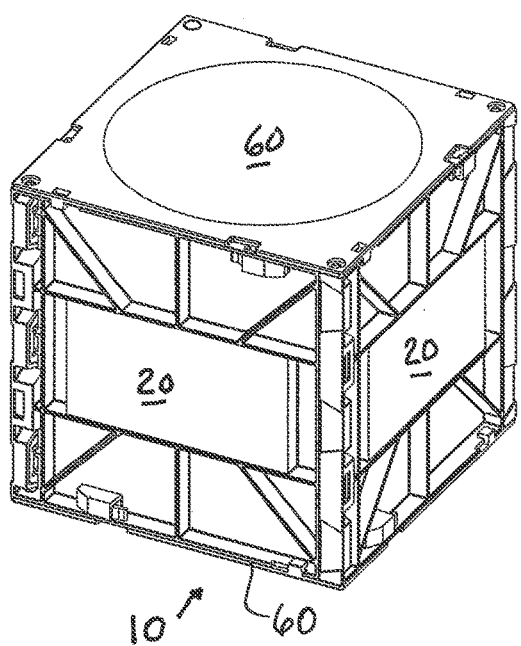
FIG. 1 is a perspective view of a container according to a preferred embodiment of the invention having one set of four sides connected together and two top/bottom pieces secured at the top and bottom of the container, respectively, in a locked position.

An embodiment of the invention is shown in FIGS. 1 and 2 in which the six sided container is shown having four side sides connected together at corners of the container and having two top/bottom pieces secured at the top and bottom of the container. The two top/bottom pieces are secured at the top and bottom of the container as shown in FIG. 2 by clockwise rotation of the top/bottom pieces with respect to the four sides of the container.

A perspective view of one side piece 20 of the container of FIG. 1 is shown in FIG. 3A. Each side piece is identical and molded the same. FIG. 3A shows an interior wall of the side piece 20. FIG. 3B is a detail view of an area 3B indicated in FIG. 3A. FIG. 4A is a perspective view of the side piece 20 showing an exterior wall of the side piece. FIG. 4B is a detail view of an area 4B indicated in FIG. 4A.

In FIG. 5, a plan view of the side is shown with the exterior wall facing. On the left side of FIG. 5 are pockets and on the right side are projections that are sized to fit in the pockets so that the side pieces are serially connected to form corner joints in a square configuration.

FIG. 6 is a cross sectional view of the side piece of the container taken along line 6-6 of FIG. 5; FIG. 7 is a cross sectional view of the side piece of the container taken along line 7-7 of FIG. 5; and FIG. 8 is a detail view of an area 8 indicated in FIG. 6.

FIG. 9 is a perspective view of two side pieces of the container shown in FIG. 1 connected together at respective edges, and forming one corner of the container.

FIG. 10 is a plan view of two side pieces of the container shown in FIG. 1 connected together and showing an exterior wall of one of the two sides.

FIG. 11 is a cross sectional view of the connected side pieces taken along line 11-11 of FIG. 10. FIG. 12 is a cross sectional view of the connected side pieces taken along long line 12-12 of FIG. 10. FIG. 13 is a cross sectional view of the connected side pieces taken along line 13-13 of FIG. 10. FIG. 14 is a detail view of an area 14 indicated in FIG. 11. FIG. 15 is a detail view of an area 15 indicated in in FIG. 12. FIG. 16 is a detail view of an area 16 indicated in FIG. 13.

Figure 17:
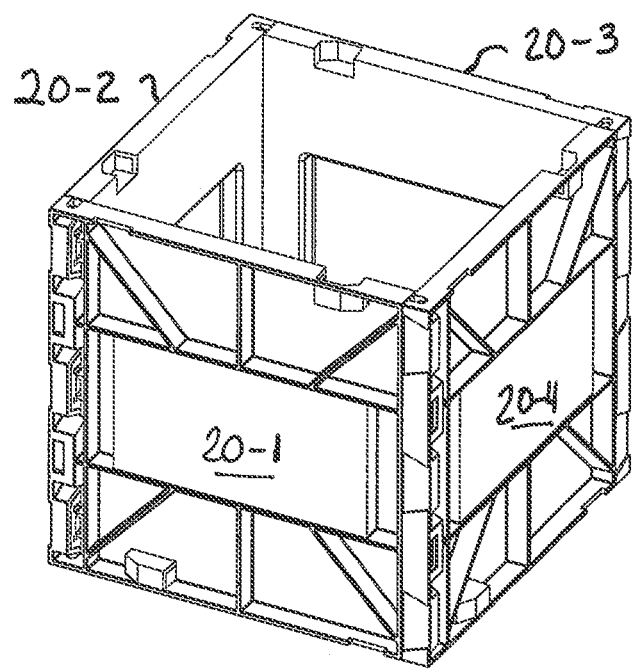
FIG. 17 is a perspective view of the container of FIG. 1 having the one set of four side pieces connected together with an open top and open bottom, i.e. without the top/bottom pieces shown.
Figure 18:
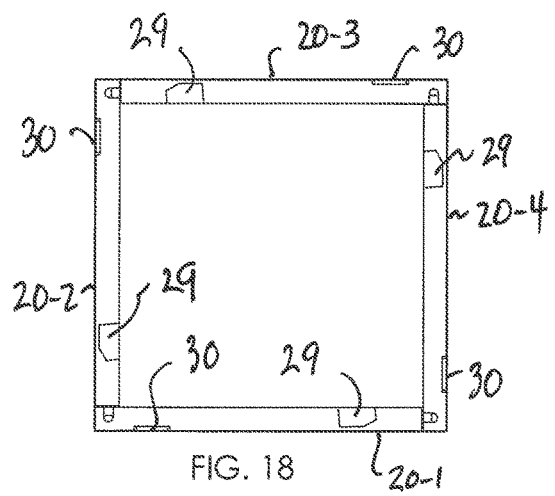
FIG. 18 is a top view of the four connected sides shown in FIG. 17.

FIG. 17 is a perspective view of the container of FIG. 1 having the one set of four side pieces connected together with an open top and open bottom, i.e. without the top/bottom pieces shown. FIG. 18 is a top view of the four connected sides shown in FIG. 17.

Figure 19:
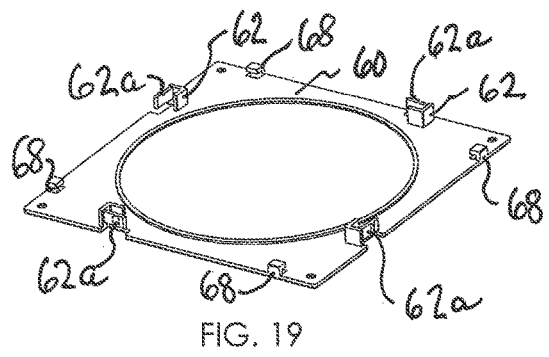
FIG. 19 is a perspective view of the top/bottom piece of the container shown in FIG. 1 (both top/bottom pieces being the same) showing an internal wall of the top/bottom piece.

FIG. 19 is a perspective view of the top/bottom piece of the container shown in FIG. 1. In an embodiment of the invention, both of the upper and lower portions of the container's four assembled side pieces 20-1, 20-2, 20-3 and 20-4 are covered by a top/bottom piece 60 and each of the top/bottom pieces 60-1 and 60-2 are molded the same. In FIG. 19, the internal wall of the top/bottom piece is shown and has a circular upstanding rib 65.

Figure 20A:
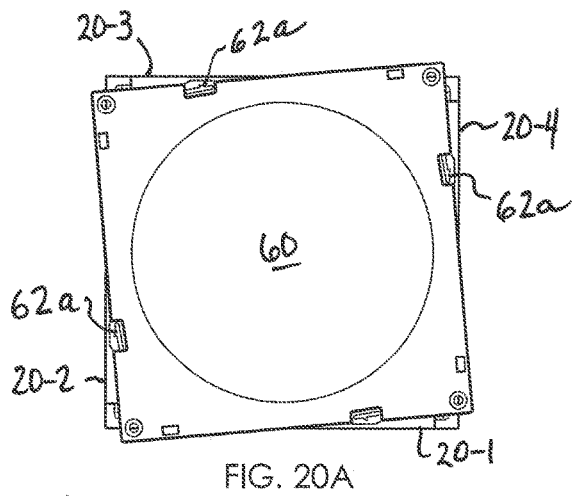
FIG. 20A is a top view of the container shown in FIG. 2 with an upper one of the top/bottom pieces shown in a position to be engaged to the four sides of the container by further clockwise rotation of the top/bottom piece with respect to the four sides.

FIG. 20A is a top view of the container shown in FIG. 2 with an upper one of the top/bottom pieces 60-1 shown in a position to be engaged to the top edges or ends of the four sides 20-1, 20-2, 20-3 and 20-4 of the container. The upstanding rib 65 of the internal wall of the top/bottom piece 60 in one embodiment of the invention may be useful as a guide when positioning the top/bottom piece onto the top/bottom ends of the four sides.

Figure 20B:
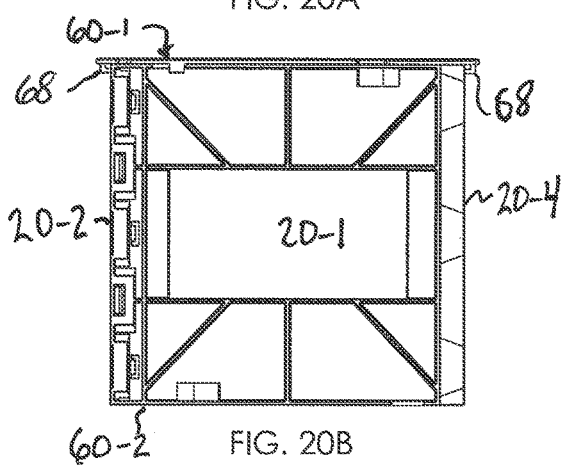
FIG. 20B is a plan view of the container as shown in FIG. 20A with an upper one of the top/bottom pieces in position to be engaged to the four sides of the container by further clockwise rotation of the upper top/bottom piece with respect to the four sides.

FIG. 20B is a plan view of the container of FIG. 1. In the engaged position of the top/bottom piece, as shown in FIGS. 20A and 20B, a depending corner shaped flange 62 has a flexible male finger tab 62a with a snap fit hook part at the terminal end thereof that snaps into place behind an edge 29a of a mating pocket 29 formed in a top edge of the side piece 20. The structure 29, 62 is shown in each of four places on each edge of the top/bottom piece 60. As shown in FIGS. 20A and 20B, the top/bottom piece 60 aligns in the four places with the corresponding pockets 29 on the top edges 26 of the set of four side pieces 20-1, 20-2, 20-3 and 20-4. This is the engaged position. Also, in the engaged position shown in FIGS. 20A and 20B, an under tab 68 along each edge of the top/bottom pieces 60 is situated in a corresponding clearance 30 along each end of the side pieces. See FIG. 24.

Then, from the engaged position of the top/bottom piece shown in FIGS. 20A and 20B (also FIG. 2), the top/bottom piece 60 is subjected to clockwise rotation with respect to the four sides 20-1, 20-2, 20-3 and 20-4 to achieve a locked position shown in FIGS. 1 and 21-24, for example. Rotation of the top/bottom piece with respect to the sides may be in the range of 4-10 degrees or an amount sufficient to cause the top/bottom piece to move into the locked position with respect to the end edges of the side pieces.

When the top/bottom piece 60 is rotated to place the top/bottom piece in the locked position, a ramp end portion of hook 63 of the depending finger tab 62a passes along a flat surface of the corresponding recess pocket 29 until the hook 63 of the flexible finger tab 62a snaps past and then engages a terminal end 29a of the flange of the corresponding recess pocket. See FIG. 25.

Also, the flexible finger 29a is able to be resiliently deformed by someone's finger at the end portion thereof when the top/bottom piece is to be unlocked as a result of rotating the top/bottom piece counterclockwise. The finger tab 62a is resiliently deformed by pressing so that the hook part 63 is lifted to disengage the terminal end 29a of the corresponding recess pocket 29 when the top/bottom piece 60 is moved out of the locked position and into the engaged position before being remove entirely form the container.

Also, the rotation causes the under tab 68 along each edge of the top/bottom pieces 60 to engage the underneath side of a top edge of the side wall in the area of the corresponding clearance 30 along each end of the side pieces. See FIG. 24 which shows the under tab 68 engaging the underneath side of a top edge 30 of the side wall 20.

Figure 23:
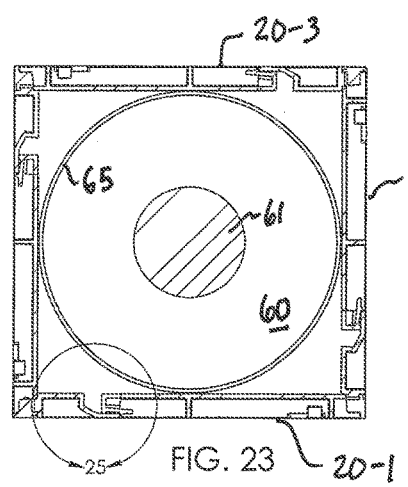
FIG. 23 is a cross sectional view of the assembled container taken along long 23-23 of FIG. 21.
Figure 25:
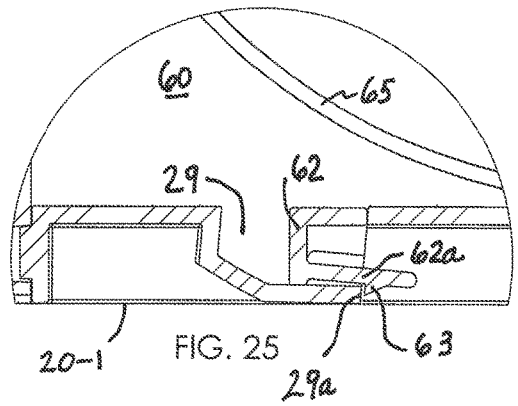
FIG. 25 is a detail view of an area 25 indicated in FIG. 23.
Figure 21:
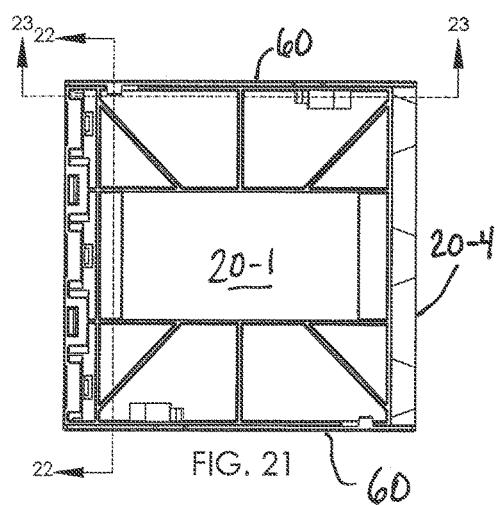
FIG. 21 is a plan view of a completely assembled container having one set of four side pieces and two (upper and lower) top/bottom pieces in the locked position as shown in FIG. 1.
Figure 22:
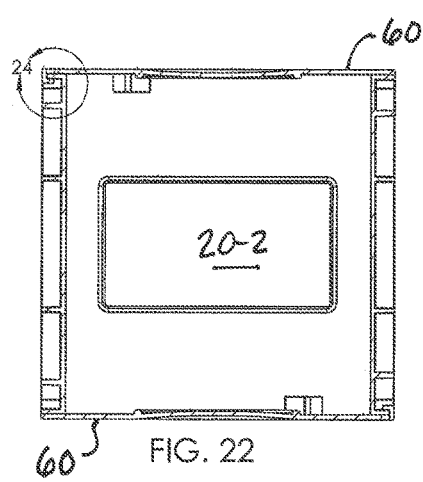
FIG. 22 is a cross sectional view of the assembled container taken along line 22-22 of FIG. 21.
Figure 24:
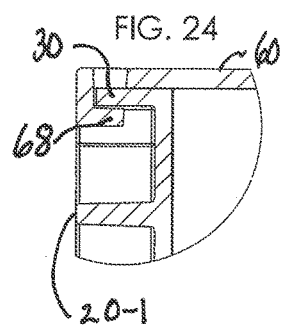
FIG. 24 is a detail view of an area 24 indicated in FIG. 22.

FIG. 21 is a plan view of a completely assembled container having one set of four side pieces and two (upper and lower) top/bottom pieces in the locked position as shown in FIG. 1. FIG. 22 is a cross sectional view of the assembled container taken along line 22-22 of FIG. 21. FIG. 23 is a cross sectional view of the assembled container taken along long 23-23 of FIG. 21. FIG. 24 is a detail view of an area 24 indicated in FIG. 22. FIG. 25 is a detail view of an area identified by 25 in FIG. 23.

Figure 26:
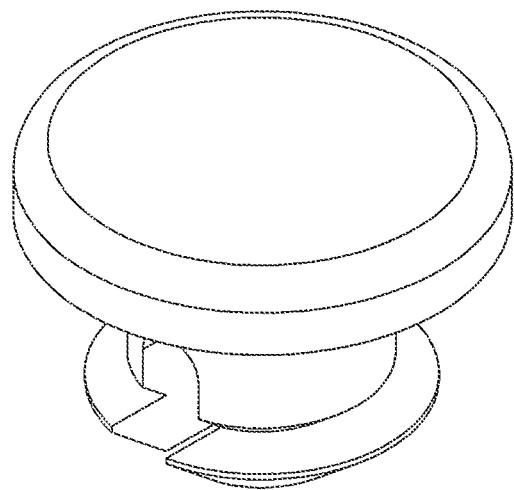
FIG. 26 is a perspective view of a tamper evident pin that can be secured into a through hole in the container top/bottom piece when the container is in the locked position of FIG. 1.
Figure 27:
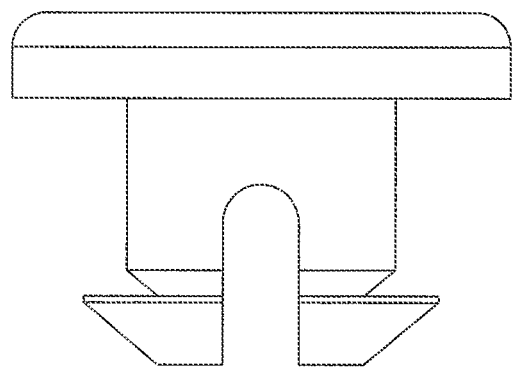
FIG. 27 is a plan view of the tamper evident pin shown in FIG. 26.
Figure 29:
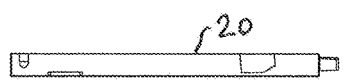
FIG. 29 is an end view (top end as shown in FIG. 28) of the side shown in FIG. 28.

When the top/bottom piece is placed in the locked position, a tamper evident pin shown in FIG. 26 may be secured into a through hole in the container top/bottom piece (shown at the corners) to engage the edge of the respective side piece. Then, if the top/bottom piece is moved to the unlocked position, the rotational movement of the top/bottom piece with respect to the sidewall would become evident upon visual inspection. FIG. 27 is a plan view of the tamper evident pin shown in FIG. 26.

Figures 28, 31:
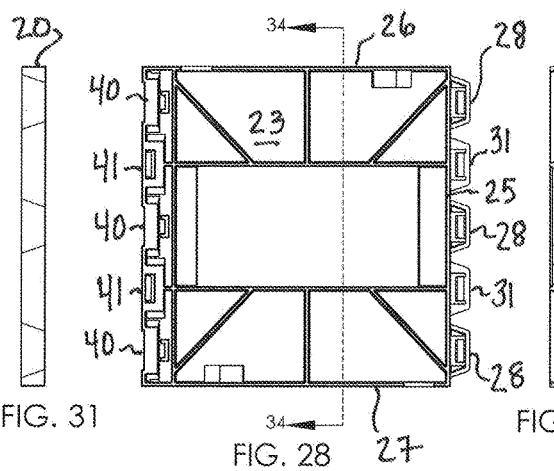
FIG. 28 is a plan view showing an exterior wall of one side piece of the container shown in FIG. 1.
FIG. 31 is an edge view (left edge as shown in FIG. 28) of the side shown in FIG. 28.
Figures 32, 34:
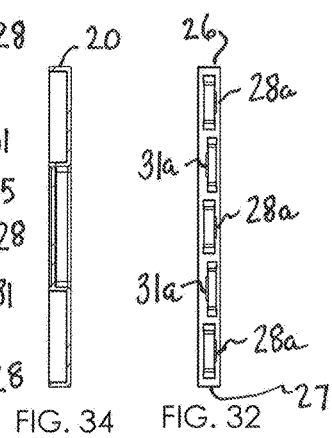
FIG. 32 is an edge view (right edge as shown in FIG. 28) of the side shown in FIG. 28.
FIG. 34 is a cross sectional view of the side piece of the container taken along line 34-34 of FIG. 28.
Figure 33:
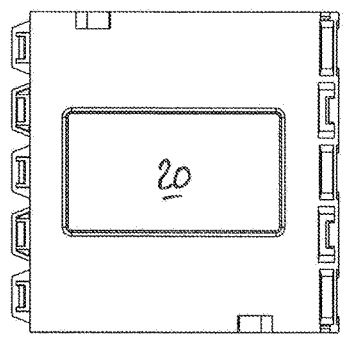
FIG. 33 is a plan view showing an interior wall of the side shown in FIG. 28.
Figure 30:
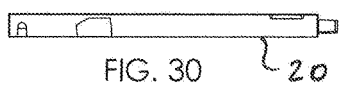
FIG. 30 is an end view (bottom end as shown in FIG. 28) of the side piece shown in FIG. 28.
Figure 35:
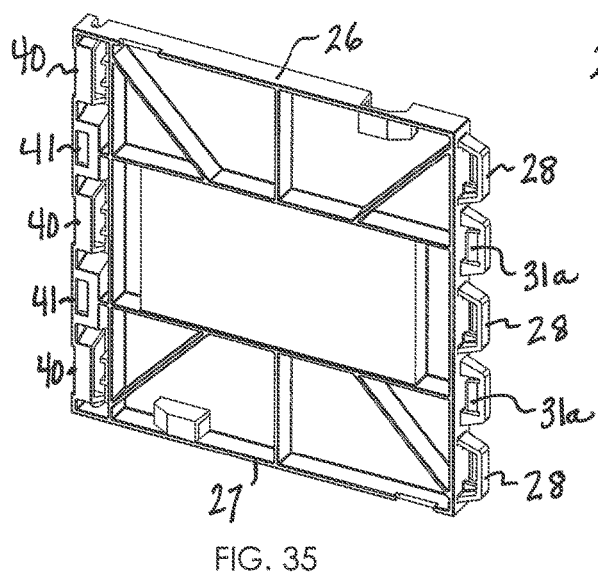
FIG. 35 is a perspective view showing an exterior wall of a side piece of the container shown in FIG. 1.
Figure 36:
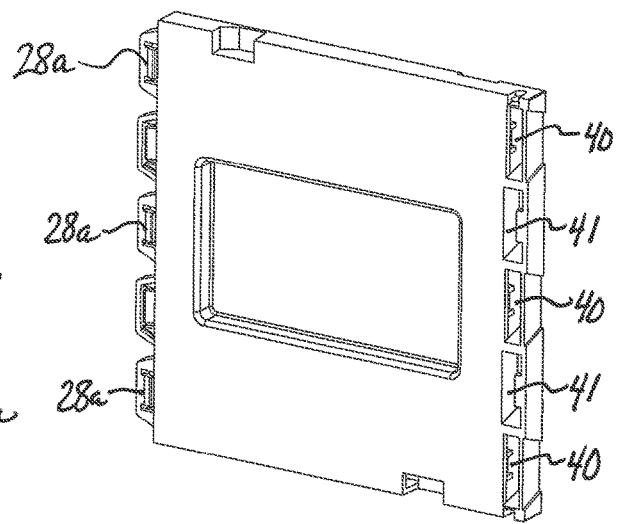
FIG. 36 is a perspective view showing an interior wall of a side piece of the container of FIG. 1.
Figure 40:
FIG. 40 is an end view from one end (top end as shown in FIG. 37) of the top/bottom piece of the container shown in FIG. 37 with the interior wall facing upwardly.
Figure 38:
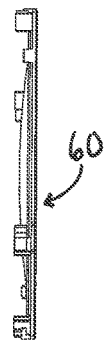
FIG. 38 is a left side view of the top/bottom piece of the container shown in FIG. 37.

FIG. 28 shows an example of a side 20 having an exterior wall shown in the figure. On a right edge of the wall shown in FIG. 28 are projections and on a left edge 24 of the side 20 are pockets. At the top, bottom and middle points of the edge 25 are projections 28; and in between projections 28 of the first type are projections 31 of a second type. The projections of the first type 28 are received within pockets 40 at the top, bottom and middle points along the edge 24 of the side piece; and the projections 31 of the second type are received in the pockets 41 located between the pockets 40. As shown in FIG. 32, and also FIGS. 3B and 4B, the projections 28 have inside locking tabs 28a. On the other hand, projections 31 have outside locking tabs 31a. When two sides 20-1 and 20-2 are assembled together as shown in FIGS. 12 and 13, the respective tabs engage structure within the pockets to snap-lock the corners together.

As shown in FIG. 16, the projections 28a are biased inwardly to engage a shoulder or edge of a structure within corresponding pockets 40. Projections 31, as shown in FIG. 15, have outside locking tabs 31a that are biased outwardly and engage a shoulder or edge of a structure within the pockets 41 to provide a snap fit between the two side pieces at the corners, thus securing the side pieces together at the corner joint formed between side pieces.

The outside locking tabs in combination with the inside locking tabs form a zipper effect in that each of the alternating locking tabs is biased oppositely to the adjacent locking tab to secure the corner joints. Also, the projections 31 having the outside locking tabs are shifted inwardly with respect to the interior wall side of the side piece 20. Further, the projections are tapered to their distal end portions and the corresponding pockets are aligned therewith and provided with drafted surfaces that guide the tapered portions into position for ensuring locking of the inside and outside locking tabs into the respective pockets.

The exterior wall of the side piece 20 has ribs for reinforcement and for minimizing thickness to save on cost of material used in the molding of the piece, while maintaining sufficient strength, and for reducing weight.

Figure 48:
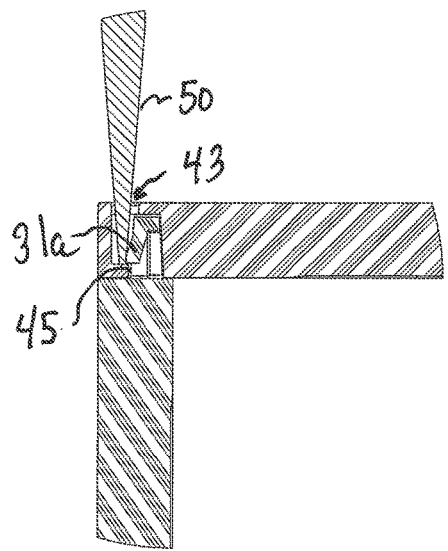
FIG. 48 is a partial view on an enlarged scale of the cross sectional view of FIG. 15 additionally showing a hand tool in position to disengage the locking tab at the position shown in FIG. 46.
Figure 49:
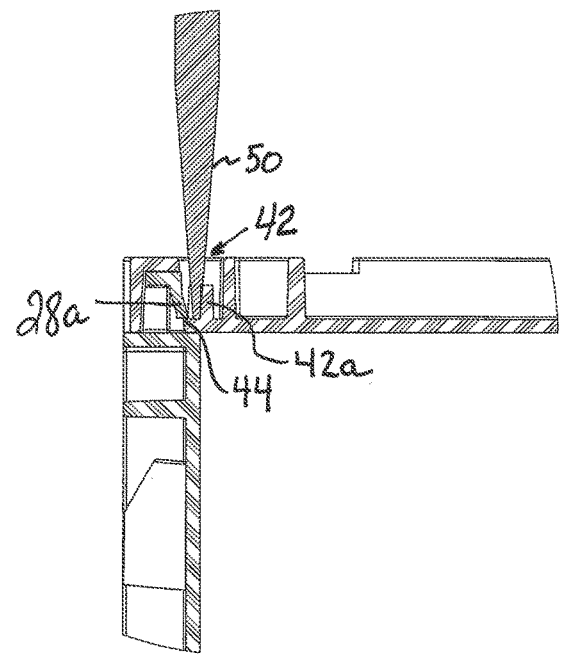

When the side pieces 20 are to be disassembled from one another, a tool, such as a screw driver 50, is able to access an opening 42 (in the top, middle and bottom positions) and 43 (between access openings 42) along an exterior wall of the pockets as shown in FIGS. 48 and 49, respectively. FIG. 49 shows the tool 50 in position in the access opening 42 and abutting an upstanding rib 42a to guide the tool 50 into position for retracting the inside locking tab 28a from engagement with the shoulder or edge 44 in the pocket 40 (against the bias of the locking tab 28a).

FIG. 48 shows the tool 50 positioned in the access opening 43 to engage the outside locking tab 31a to disengage the tab 31a from the snap fit with the shoulder or edge 45 in the pocket 41. Guidance of the tool 50 into the access opening to abut the tab 31a (against the bias of the tab 31a) is provided by the shape of the access opening 42.

Figure 46:
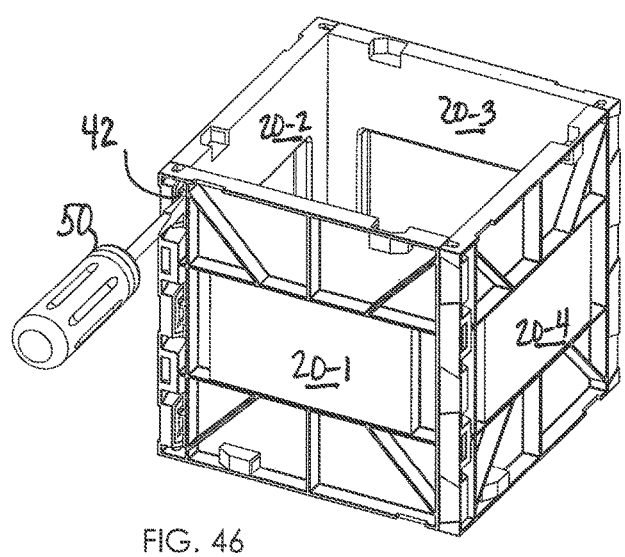
FIG. 46 shows a perspective view of the container of FIG. 1 having one set of four sides connected as shown in FIG. 17, and also showing a hand tool being used to disassemble a corner joint of the container by disengaging an upper locking tab structure that is resiliently held in position to engage the respective edges of adjacent side pieces of the container.
Figure 47:
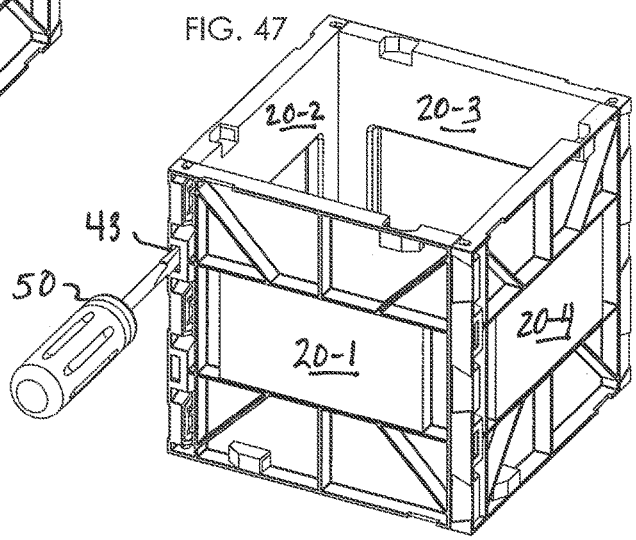
FIG. 47 shows a perspective view of the one set of four sides connected as shown in FIG. 46, and also showing a hand tool being used to disassemble the corner joint of the container by disengaging a middle locking tab structure such that disassembly of the corner joint is achieved by disengaging each locking tab structure along one corner of the container from top to bottom which is repeated at each corner of the container.

As shown in FIGS. 46 and 47, disassembly of the container side pieces is able to be performed with a simple hand tool which is made possible by engaging the inside and outside locking tabs with the hand tool through the access openings 42, 43 of the pockets 40, 41 on the exterior wall side of the side pieces. For example, a user may start from the top (as shown in FIGS. 46 and 47) and work toward the bottom, disengaging the inside locking tabs and outside locking tabs alternately. Further, each corner of the container 10 is disassembled in the same manner until the container is reduced to individual flat side pieces 20 for future reassembly or recycling of the pieces.

Figure 37:
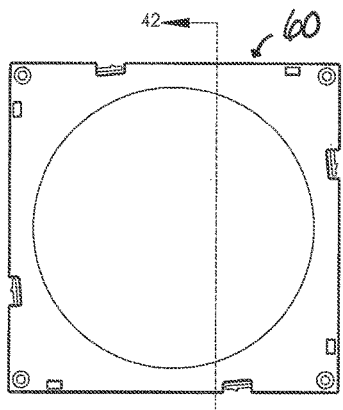
FIG. 37 is a plan view showing an exterior wall of the top/bottom piece of the container shown in FIG. 1.
Figure 42:
FIG. 42 is a cross sectional view of the top/bottom piece taken along line 42-42 of FIG. 37.
Figure 39:
FIG. 39 is a right side view of the top/bottom piece shown in FIG. 37 of the container.
Figure 43:
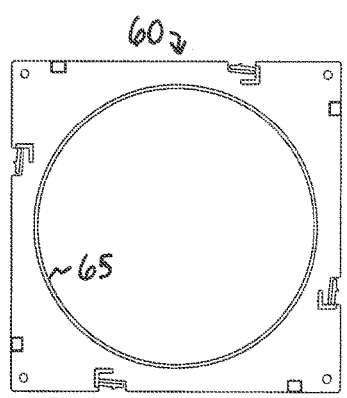
FIG. 43 is a plan view showing an interior wall of the top/bottom piece of the container shown in FIG. 37.
Figure 41:
FIG. 41 is another end view (bottom end as shown in FIG. 37) of the top/bottom piece shown in FIG. 37 with the interior wall facing downwardly.
Figure 44:
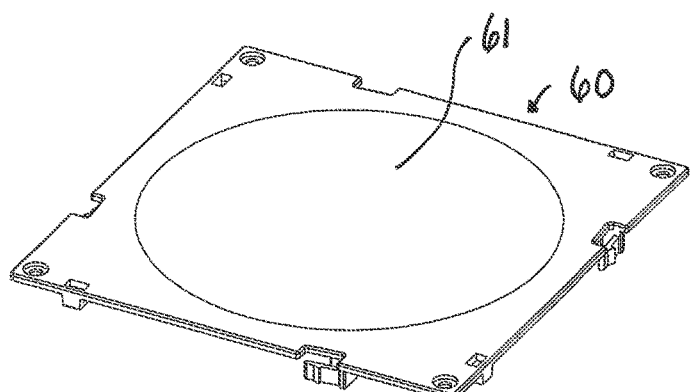
FIG. 44 is a perspective view of the top/bottom piece of the container shown in FIG. 37 with the exterior wall facing upwardly.
Figure 45:
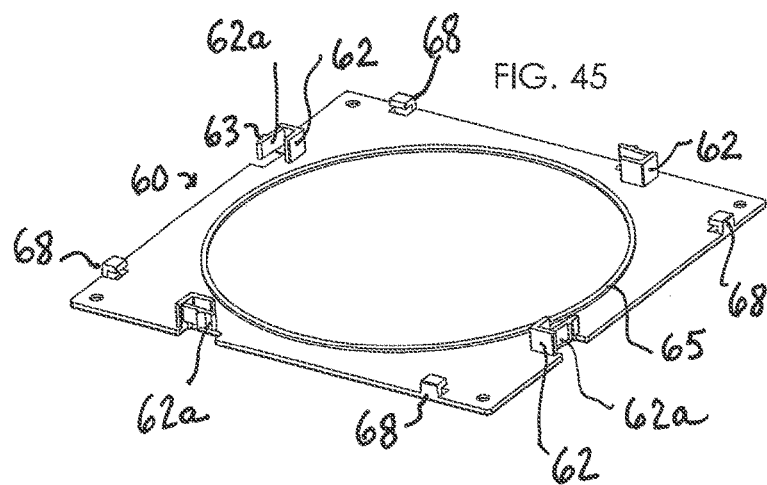
FIG. 45 is a perspective view of the top/bottom piece shown in FIG. 37 with an interior wall facing upwardly.

As shown in FIG. 37, an exterior wall of the bottom/top piece 60 has a concave central portion 61, also shown in FIGS. 38-41. The concave central portion 61 enables a lifting device having opposing jaws to engage the top/bottom pieces from opposite points to enable secure engagement of the container when assembled. Also, the rim 65 around the concave central portion 61 (when viewed from the interior wall of the top/bottom piece) aids in guiding the top/bottom piece into position for locking the top/bottom piece onto the assembled set of four sides. Also, the concave top and bottom portion is suitable for a bar code label which will not be scraped off during the handling of the container on a flat surface.

Figure 52:
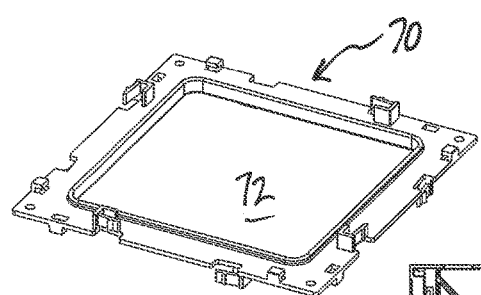
FIG. 52 is a perspective view of a locking ring used to securely connect adjacent sets of four side pieces together for increasing a size of a modular container.
Figure 51:
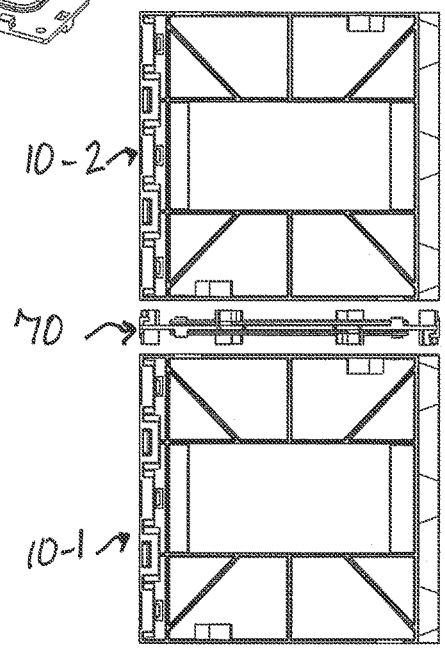
FIG. 51 is an exploded plan view of the two sets of four side pieces of the modular container connected together by an intermediate locking ring and without the top/bottom pieces being shown.
Figure 50:
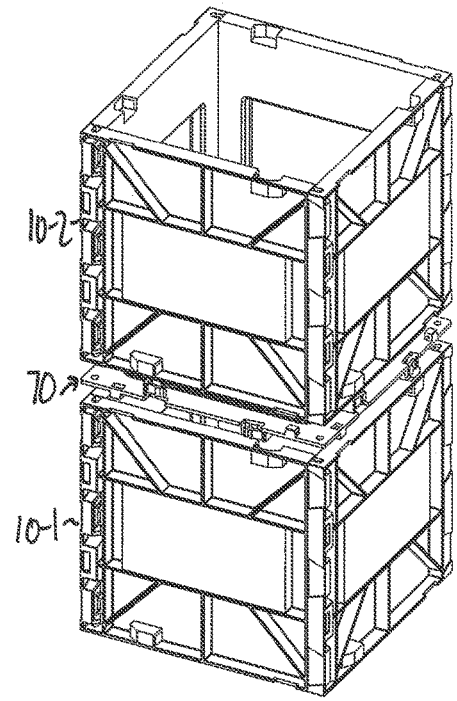
FIG. 50 is an exploded perspective view of two adjacent sets of four side pieces of the modular container connected together by an intermediate locking ring and without the top/bottom pieces being shown.

A modification of the container is able to be achieved by providing a locking ring 70 between two sets 10-1 and 10-2 of four sides of the container as shown in FIGS. 50-52. The locking ring 70 shown in FIG. 52 has the finger tab and under tab features of the top/bottom piece 60 on both the upper and lower sides of the locking ring so that, as shown, the lower side of locking ring 70 engages the set of four sides 10-1 and the upper side structure engages the upper set of four sides 10-2. Further, a square or rectangular opening 72 is provided in the central part of the locking ring 70 so that the volume of the container is continuous between the two sets of four sides 10-1 and 10-2 of the container when joined together by the locking ring.

Figure 54:
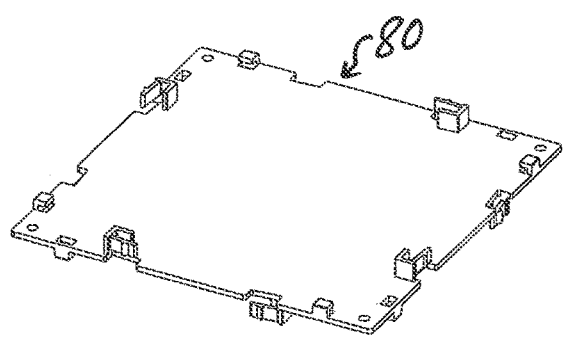
FIG. 54 is a perspective view of the locking divider for connecting two adjacent sets of four side pieces of the modular container together.
Figure 53:
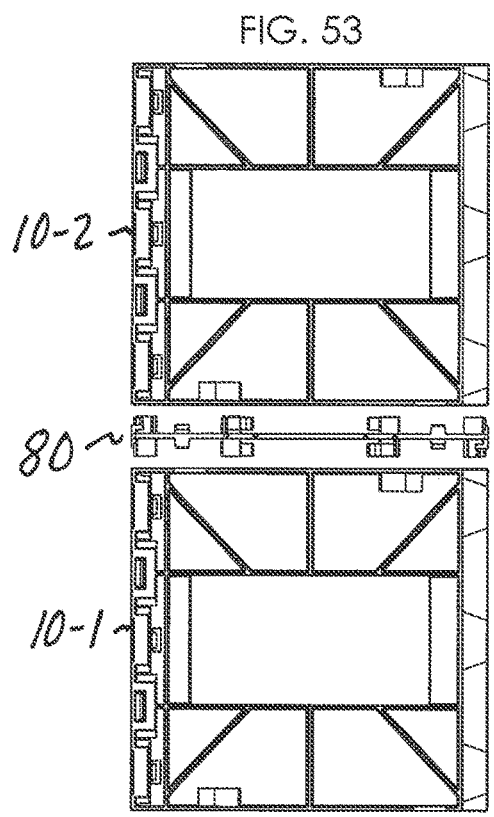
FIG. 53 is an exploded perspective view of two adjacent sets of four side pieces of the modular container connected together by an intermediate locking divider and without the top/bottom pieces being shown.

As shown in FIGS. 53 and 54, another embodiment utilizes a locking divider 80 that is secured between two sets of four sides 10-1 and 10-2 of the container. The locking divider 80 also has the finger tab and under tab features of the top/bottom piece 60 on both the upper and lower sides of the locking divider so that, as shown, the lower side of locking divider 70 engages the set of four sides 10-1 and the upper side structure engages the upper set of four sides 10-2. The locking divider separates the two sets of four sides 10-1 and 10-2 of the container into separate compartments of the container. After joining the two sets of four sides 10-1 and 10-2 of the container together with the locking ring 70 or locking divider 80, the top and bottom pieces can be secured to complete the container and a modular container of many different sizes is achieved as a result.

According to embodiments of the invention, it is possible to assemble the modular container by hand, and disassemble the modular container by hand with only a hand tool for disassembly of the corner joints.

Although square dimensions of the side pieces 20 and top/bottom pieces 60 are shown, any rectangular shape can be used for the side pieces. In one example, the side pieces may have the dimension of the side pieces of a typical pizza box. The sides 20 will always have the same dimensions according to the embodiments of the invention to minimize the number of molded parts required to assemble a modular container. And, the top/bottom pieces 60 are always the same dimensions for each modular system. Thus, different container sizes are able to be assembled from the same side pieces and top/bottom pieces in combination.

The containers are able to be injection molded from thermoplastic polymers of different colors. For example, one color may indicate fragile contents, and another color may indicate next day delivery. Also, see-through or translucent material properties of the material from which the parts are molded may be useful for confirming the contents of the container without opening the container.

Each of the component parts of the container are able to be manufactured from, for example, injection molding from a thermoplastic polymer such as polyethylene including HDPE, polypropylene, PETG (Polyethylene terephthalate). The component parts are able to be molded with a degree of flexibility that enhances the assembly/disassembly of the containers and the engaging and disengaging of the tabs with the engaging surfaces in the assembly of the corner joints of the container. The flexibility is achieved by the material used to mold the parts and the dimensions of the engaging portions of the pieces. Further, the material of the component parts may be molded from any suitable polymers dictated by specifications or application.

While preferred embodiments of a container having dispensing outlets for preventing collection of residual material, in accordance with the present invention, have been set forth fully and completely hereinabove, it will be apparent to one of skill in the art that various changes, for example the type of material used to manufacture the container, the overall shape of the container, the method of collapsing of the container, and the like could be made without departing from the true spirit and scope of the present invention, which is accordingly to be limited only by the appended claims.

What is claimed is:

1. A container comprising:
   identical side pieces of a first synthetic resin molded part and identical top or bottom pieces of a second synthetic resin molded part,
   each of said side pieces of said first molded part having opposed first and second side edges including pockets on the first side edge and projections on the second side edge, wherein the projections on the second side edge of one of the side pieces of said first molded part are configured to fit in the pockets on the first side edge of another one of the side pieces of said first molded part to serially connect the side pieces of the first molded part together at respective corner joints in a closed configuration of serially connected side pieces as sides walls of the container;
   each of said side pieces of said first molded part having opposed upper and lower edges;
   each of said top or bottom pieces of said second molded part configured to cover the configuration of the serially connected side pieces of the first molded part as a top wall and an opposing bottom wall of the container; and
   each of said top or bottom pieces of said second molded part having an outer periphery and at least one flange along the outer periphery that engages a respective one of the upper and lower edges of the serially connected side pieces of said first molded part to connect the side pieces of said first molded part to the top or bottom pieces of said second molded part to close the container, wherein
   the projections of each of said side pieces of said first molded part on the second side edge have flexible locking tabs with depending flanges,
   the flexible locking tabs include first and second locking tabs disposed alternately along the second side edge of the side pieces of the first molded part,
   said first locking tabs are disposed at positions including the top and bottom of the second edge and the second locking tabs are disposed between the first locking tabs,
   each of the first locking tabs is biased inwardly of the container and each of the second locking tabs is biased outwardly of the container, and
   the pockets on the first side edge are aligned to correspond with the projections on the second side edge and the pockets include shoulder portions aligned with the flexible locking tabs so that the depending flanges of the first and second locking tabs of one of the side pieces of said first molded part are configured to respectively engage the shoulders of the pockets on the second side edge of another one of the side pieces of said first molded part to serially connect the side pieces of the first molded part together at the respective corner joints.

2. The container according to claim 1 further including each of said upper and lower edges having pockets in which the depending flange is received such that relative rotation of the top or bottom pieces of said second molded part with respect to the serially connected side pieces of said first molded part causes engagement of said flanges with the respective one of the upper and lower edges of the serially connected side pieces of said first molded part to connect the side pieces of said first molded part to the top or bottom pieces of said second molded part to close the container.

3. The container according to claim 2, further including an under tab along the outer periphery of the side pieces of the first molded part that are received in corresponding clearances along each of the opposed upper and lower edges of the top or bottom pieces of the second molded part so that the under tabs engage the opposed upper and lower edges of the pieces of the second molded part by the relative rotation of the top or bottom pieces of said second molded part with respect to the serially connected side pieces of said first molded part.

4. The container according to claim 1,
   wherein predetermined ones of the projections are laterally offset with respect to other ones of the projections with respect to center alignment along the second edge from top to bottom.

5. The container according to claim 4, wherein said flexible locking tabs of said predetermined ones of the projections are biased oppositely from said flexible locking tabs of said other ones of the projections such that each adjacent and laterally offset projection includes a respective one of the flexible locking tabs that is oppositely biased to enable a zipper effect with respect to the engagement and disengagement of the flexible locking tabs of one of the side pieces of said first molded part with the shoulder portions of the pockets on the second side edge of another one of the side pieces of said first molded part when respectively assembling and disassembling the respective corner joints.

6. The container according to claim 1, further including openings in which a tool may be inserted to disengage the flexible locking tabs from engaging with the respective shoulder portion in the pocket for disassembly of the corner joints.

7. The container according to claim 1, wherein the top or bottom pieces of said second molded part include a central concave depression with respect to an outer surface of the container when assembled.

\* \* \* \* \*